US008995335B2

(12) United States Patent
Vainikka et al.

(10) Patent No.: US 8,995,335 B2
(45) Date of Patent: Mar. 31, 2015

(54) SCALABLE DEPLOYMENT OF NETWORK NODES

(75) Inventors: Markku Juha Vainikka, Kiviniemi (FI); Vinh Van Phan, Oulu (FI); Ling Yu, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 600 days.

(21) Appl. No.: 12/808,215

(22) PCT Filed: Dec. 16, 2008

(86) PCT No.: PCT/EP2008/067583
§ 371 (c)(1),
(2), (4) Date: Jun. 28, 2010

(87) PCT Pub. No.: WO2009/080601
PCT Pub. Date: Jul. 2, 2009

(65) Prior Publication Data
US 2010/0296448 A1 Nov. 25, 2010

(30) Foreign Application Priority Data

Dec. 19, 2007 (FI) .................................... 20070995

(51) Int. Cl.
H04W 4/00 (2009.01)
H04W 92/20 (2009.01)
H04W 40/22 (2009.01)
H04W 84/04 (2009.01)
(52) U.S. Cl.
CPC .............. *H04W 92/20* (2013.01); *H04W 40/22* (2013.01); *H04W 84/045* (2013.01)
USPC ......................................................... 370/328

(58) Field of Classification Search
None
See application file for complete search history.

(56) References Cited

U.S. PATENT DOCUMENTS

2010/0178941 A1* 7/2010 Chun et al. .................... 455/458
2010/0265866 A1* 10/2010 Chao et al. .................... 370/312

FOREIGN PATENT DOCUMENTS

EP           1 753 252 A1    2/2007
WO      WO 2005/067225 A1    7/2005
(Continued)

OTHER PUBLICATIONS

WO 2007/053958 A1 Wireless Relay Network Media Access Control, Layer Control, Plane System and Method by Zhang et al., Filing Date: Nov. 10, 2006.*

(Continued)

*Primary Examiner* — Andrew Lai
*Assistant Examiner* — Leon Andrews
(74) *Attorney, Agent, or Firm* — Harrington & Smith

(57) ABSTRACT

A method for communicating between nodes in a communication system. Communicating in a first node in a radio access network and a second node in a core network using messages associated with a first set of operations connecting the first node to the core network. Communicating in the first node with other nodes of the radio access network using messages associated with a second set of operations connecting the radio access network nodes. Communicating in the first node with a third node using messages associated with a third set of operations, the third set of operations providing at least part of the operations provided by the first and second set of operations. The scalability of the core network nodes is enhanced when the number of the radio access network nodes connecting to the core network nodes increases.

30 Claims, 6 Drawing Sheets

(56) References Cited

FOREIGN PATENT DOCUMENTS

| WO | WO 2006/034578 A1 | 4/2006 | |
|---|---|---|---|
| WO | WO 2007/053948 A1 | 5/2007 | |
| WO | WO 2007053948 A1 * | 5/2007 | 370/228 |

OTHER PUBLICATIONS

WO 2007/053948 A1 Title: Wireless Relay Network Media Access Control Layer Control Plane System and Method, Inventor: Zhang et al. Filing Date: Nov. 10, 2006.*

3GPP TR R3.020, V0.0.2 (Apr. 2007), "3$^{rd}$ Generation Partnership Project; Technical Specification Group Radio Access Network; Home (e)NodeB; Network Aspecrs (Release 7)", 12 pgs.
3GPP TS 36.300, V8.2.0 (Sep. 2007), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN; Overall description; Stage 2 (Release 8)", 109 pgs.
3GPP TS 36.410, V8.0.0 (Dec. 2007), 3$^{rd}$ Generation PArtnership Project; Technical Specification Group Radio Access Network; Evolved Universal Terrestrial Access Network (E-UTRAN); S1 General aspects and principles (Release 8), 14 pgs.

* cited by examiner

SCALABLE DEPLOYMENT OF NETWORK NODES

FIELD OF THE INVENTION

The present invention relates to communications networks employing base stations. More particularly the present invention relates to a scalability solution for deploying increasing number of base stations in communications networks.

BACKGROUND OF THE INVENTION

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A wireless communication network refers to a communications network that provides radio signal coverage over a geographical area. Examples of such networks are for example UMTS (Universal Mobile Telecommunications System), GSM (Global System for Mobile Communications) or WiMAX (Worldwide Interoperability for Microwave Access), wherein radio signal coverage is provided through base stations. In general the base stations connect through a backhaul connection to a gateway, such as in WiMAX, or some other central node in the network, such as BSC (base station controller) or RNC (radio network controller). Thus, the central node, for example, and the connections from the base stations to the central node, have to have enough capacity to handle the traffic introduced by the base stations.

In 3GPP ($3^{rd}$ Generation Partnership Project) work is being done on the evolution of the existing UMTS standards, under the name of LTE (Long Term Evolution). In LTE the air-interface part of the network is being defined as E-UTRAN (Evolved Universal Terrestrial Radio Access). The base stations in LTE are called the eNBs (Evolved UTRAN NodeBs) which connect to MME (Mobility Management Entity) and S-GW (Serving Gateway) in the core network through S1 logical interface. The MME handles the control plane and S-GW handles the user plane traffic processing and they may reside in the same network node. The eNBs are connected to each other through an X2 logical interface. In E-UTRAN the eNBs provide radio signal coverage which is used by the user equipment to connect to the network.

To improve the quality of the connections and fill gaps in the radio signal coverage in wireless communication networks, such as those mentioned above, the coverage of the network can be extended and complemented by adding base stations. In a scenario of LTE E-UTRAN being worked on in 3GPP, radio signal coverage of a wireless network is extended to provide signal coverage in homes with Home NodeBs (HNBs), as described in 3GPP TR R3.020 v.0.0.2 (2007-04).

In such a scenario, the overall number of base stations including, eNBs and HNBs, becomes very large. In order for each base station, eNB or HNB, to have S1 connection with MME/S-GW, the MME/S-GW need to have increased traffic handling capability and processing power. Even though the subscriber traffic from the HNBs would be small, the number of HNBs may require increased capacity from the MME/S-GW in order to control and manage the HNBs and user equipment connected through the HNBs to the network—thus on the control plane.

The large number of deployed base stations, as increased by the HNB scenario in a wireless communications network, introduces a scalability problem to the higher level network nodes, such as MME and S-GW in the case of 3GPP LTE.

BRIEF DESCRIPTION OF THE INVENTION

An object of the present invention is thus to provide a method, an apparatus, a computer program product and a system so as to overcome the above problems. The objects of the invention are achieved by a method, an apparatus, a computer program product and a system which are characterized by what is stated in the independent claims. The preferred embodiments of the invention are disclosed in the dependent claims.

The invention enhances the scalability of the core network nodes when the number of the radio access network connecting to the core network nodes increases.

The invention also facilitates providing of mobility support for the radio access network nodes when the number of the radio access network nodes is increased.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following the invention is described employing the context and terminology of an E-UTRAN (Evolved Universal Terrestrial Radio Access Network) as defined in 3GPP TS 36.300 V8.2.0 (2007-09) and TR R3.020 v.0.0.2 (2007-04), although the invention can be applied to other networks and technologies.

Figure 1:
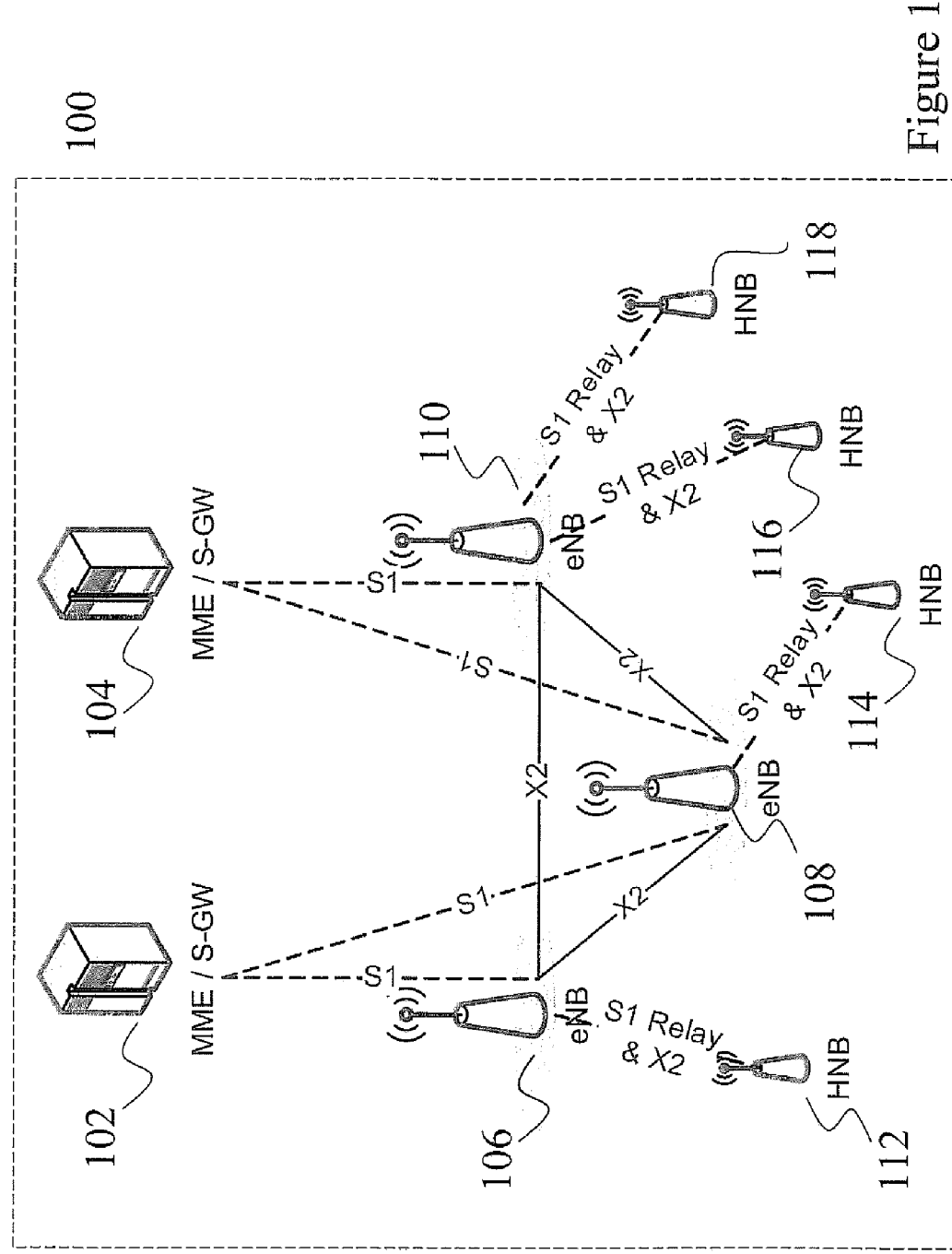
FIG. 1 shows logical interfaces in LTE network in accordance with an embodiment of the invention.

FIG. 1 illustrates an LTE network 100, comprising a core network part EPC (Evolved Packet Core) and radio access part (E-UTRAN), where an embodiment of the present invention is implemented. The connections shown in FIG. 1 are logical connections; the actual physical connections may be different. It is apparent to a person skilled in the art that the systems also comprise other functions and structures. The MME and S-GW of EPC can reside in a single node in the network or be separated. Thus, in FIG. 1 an implementation is shown where the MME and S-GW are in a single network node MME/S-GW 102, 104. The network of FIG. 1 provides radio signal coverage through eNBs 106, 108, 110. As is defined in 3GPP specifications, 3GPP TS 36.300 for example, the MME/S-GW connect to eNBs using S1 logical interface and eNBs connect to each other using X2 logical interface.

A logical interface such as S1 and X2 in FIG. 1, can be defined as a set of operations. The set of operations can comprise protocols and functions provided between nodes in the network. When nodes are connected using a logical interface, they implement means to decode and receive communications through the interface, thus the nodes can decode and receive the protocols used for communications on that interface. In addition to just decoding the protocols, a logical interface defines messages transmitted between the nodes. The messages enable services and functions between the nodes. Accordingly a logical interface defines a set of operations. For example in LTE network, such as network in FIG. 1, S1 interface operations comprise setting up, modifying and release of SAE (System Architecture Evolution) bearers, mobility support, paging, transport of NAS (non-access stratum) signaling, S1 interface management, network sharing, roaming and area restriction, NAS node selection and initial context setup. X2 interface operations comprise intra LTE mobility support such as handover control, load management and error handling.

The current work being done in 3GPP targets at introducing the LTE E-UTRAN network Home NodeBs (HNBs). HNB can be seen as a base station to provide radio signal coverage on a relatively small area such as at people's homes and areas where it would not be cost efficient to deploy a fully-fledged eNB. Also, the responsibility of deployment and start-up of HNBs can be delegated from the operators of the network to subscribers of the network. Thus, subscribers subscribed to a network such as shown in FIG. 1 can deploy HNBs to extend their subscription network coverage. The HNBs may be preconfigured by the network operator, to operate in the network. Alternatively the subscriber may perform all or part of the configuration according to instructions from the network operator.

In FIG. 1 network 100, Home NodeBs (HNBs) 112, 114, 116 and 118, are deployed to extend the radio signal coverage of the eNBs. While providing radio signal coverage like eNBs, HNBs do not necessarily contain all the same functionalities as eNBs. In FIG. 1, HNBs are connected to the network via eNB providing a relayed S1 interface and X2 interface for HNB. Accordingly, each HNB only communicates directly with single eNB operating on higher network layer than HNB. eNB operating on a higher network layer is connected to a centralized node in the network or has a shorter connection than HNB to such a node. In the following such eNB is called a macro-layer eNB. Macro-layer eNBs 106, 108, 100 in FIG. 1 are configured to provide S1 and X2 connectivity for HNBs. Consequently, S1 and X2 connections of HNBs are handled by the macro-layer eNB. For example, macro-layer eNB such as eNB 106 provides X2 interface between HNBs 112 and 114 and a relayed S1 interface between HNBs and the MME/S-GW 102. Thus, communications between HNBs and between HNB and core network is enabled.

When HNB is connected to the network, default macro-layer eNB is selected and defined for HNB. HNB connecting to the network connects to the network through the default macro-layer eNB and sets up connectivity with MME/S-GW. The default macro-layer eNB may be defined for example in HNB as IP (Internet protocol) address the HNB connects to for connecting to the network. During the operational time of HNB the macro-layer connection of the HNB can be re-directed to another eNB due to load balancing between the eNBs. Re-direction may also be done due to failures in the eNB for example if the eNB or individual cells of eNB are out of use. The default macro-layer eNB is defined in HNB when HNB is initially connected to the operator's network (e.g. first time) so that HNB can connect to the default macro-layer eNB also after disconnection. This may be the case for example when switching on the HNB after switching it off.

Macro-layer eNB connecting one or more HNBs to network provides at least part of the operations of S1 and X2 interface to HNBs by relaying the S1 and X2 connections to HNBs.

Figure 2:
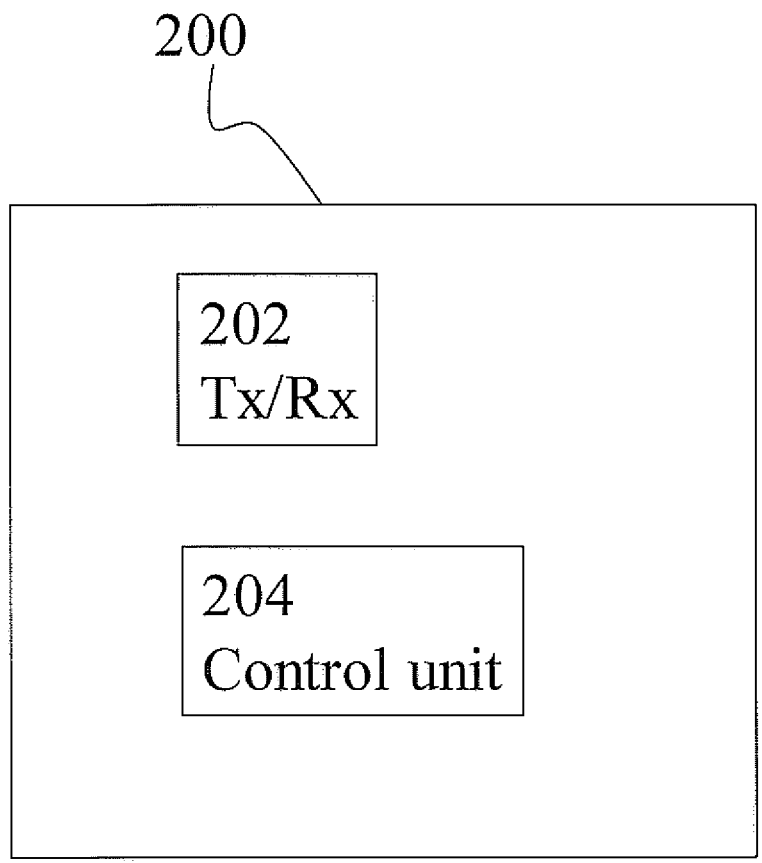
FIG. 2 shows an apparatus in accordance with an embodiment of the invention.

FIG. 2 shows a block diagram of an apparatus according to an embodiment of the invention. The apparatus comprises communication means such as means for transmitting and means for receiving. The apparatus also comprises means for establishing connections to other devices, for example devices in the network 100 of FIG. 1. These may be implemented in separate units or in a single functional transceiver unit Tx/Rx 202. Tx/Rx unit may comprise of one or more physical wired or wireless interfaces or logical interfaces for different networking technologies and thus Tx/Rx unit may be configured to operate according to at least one of these technologies. An example of a communication technology used in the apparatus 200 is LTE defined by 3GPP. Although the apparatus has been depicted as one entity, different modules and memory may be implemented in one or more physical or logical entities. The functionality of the Tx/Rx 202 and control unit 204 is described in more detail below. It should be appreciated that the apparatus may comprise other units used in or for communications or controlling the communications. However, they are irrelevant to the actual invention and, therefore, they need not to be discussed in more detail here. In the embodiment of the invention in LTE network, the Tx/Rx unit of the apparatus is configured to implement functionality pertaining to logical interfaces defined in LTE. For example the apparatus may be MME, S-GW, eNB or HNB in LTE E-UTRAN network and be configured to implement logical interfaces for communication with other apparatuses in LTE network. Consequently, the Tx/Rx unit may be configured to provide radio signal coverage and access to the LTE network to UEs (user equipment) such as mobile terminal, phones or other apparatuses connecting wirelessly to the communication network. Providing radio signal coverage enables the UEs to connect to the network 100 and the subscribers of the UEs gain access to the services available through the network. The services may be for example the Internet. The apparatus comprises also a control unit 204 for controlling transmission of the Tx/Rx unit 202.

In an embodiment of the invention the apparatus 200 is MME/S-GW of LTE network, such as network 100 in FIG. 1. In the embodiment the Tx/Rx 202 in configured to provide S1 interface towards E-UTRAN, to connect the eNBs to the network and provide S1 interface operations to eNBs. In the embodiment the control unit 204 is configured to route traffic to eNBs, HNBs and to the user equipment (UEs), connecting to the network. As can be seen in FIG. 1, HNBs are connected to the network via macro-layer eNBs. Therefore, HNBs do not have direct connection to the core network and MME/S-GW. Traffic destined to HNBs or UE's connected to the network has to be routed via eNBs to HNBs. In order to do this, MME/S-GW implements means for determining the macro-layer eNB which is used to route traffic to certain HNB. The means may be for example routing tables. Therefore, the routing table in MME/S-GW store information about HNBs and associated macro-layer eNBs. The information may be for example associated HNB and eNB addresses. According to an embodiment of the invention, the messages related to LTE S1 communication of certain HNB, are routed to the HNB via macro-layer eNB. If MME/S-GW does not have direct address of the destination HNB, MME/S-GW uses the routing table to determine eNB to route HNB S1 messages to. Also, it may be that the HNB address in MME/S-GW routing table is the same as or refers to eNB address. In both cases the messages to HNB are addressed to macro-layer eNB connecting HNB to the network. However, also direct addressing of HNB may be used in MME/S-GW if such is available. The control unit 204 in MME/S-GW may be further configured to determine the routing of messages based on IP (Internet Protocol) addresses, or Ethernet addresses. Consequently the MME/S-GW may be configured to send S1 messages to HNB via macro-layer eNB by sending the messages using IP addressing to macro-layer eNB connecting HNB to the network.

In an embodiment of the invention the apparatus 200 is eNB in LTE E-UTRAN operating as macro-layer eNB for connecting one or more HNB to LTE network and providing radio access for UEs to access the LTE network. According to the LTE specifications, eNB may have a logical interface S1 to communicate with EPC (Evolved Packet Core) and a logical interface X2 to communicate with other eNBs. The Tx/Rx unit 202 is, therefore, configured to communicate with core network using S1 interface and with other eNBs using X2 interface, as defined in LTE E-UTRAN. The connections between eNB and HNB and eNB and core network may be wireless or wired. HNBs communicate with the macro-layer eNB using a logical interface providing HNBs X2 and S1 connectivity, such as interface between eNB 106 and HNB 112 in FIG. 1. Consequently HNBs are enabled at least part of S1 interface operations and at least part of X2 interface operations in LTE network. For example, the logical interface between HNB and macro-layer eNB enables HNB connectivity to EPC and communications between HNBs, via the macro-layer eNB. The control unit 204 in eNB is configured to control communications between the macro-layer eNB and the one or more HNB it interfaces with. For example control unit 204 in macro-layer eNB may be configured to control handovers between HNBs using the X2 interface provided to the HNBs. The macro-layer HNB may also control a handover between itself and HNB connected to it. Thus, UEs connected to HNBs may perform handover to another HNB or the macro-layer eNB itself, as instructed by the macro-layer eNB. When macro-layer eNB controls handover between itself and HNB or between HNBs, the HNB interfaces to the network through the macro-layer eNB. Consequently, S1 interface provided by macro-layer eNB is maintained the HNB. Therefore, the macro-layer eNB provides S1 interface to HNB before and after the handover. In this way, the tunnelling provided by the macro-layer eNB for messages to HNB is maintained and HNB S1 connection does not have to be established through another macro-layer eNB.

In macro-layer eNB, the control unit 204 is configured to enable S1 interface relaying between EPC and HNB. Thus the control unit enables HNB connecting to macro-layer eNB S1 communications to the core network. The controlling may include identifying messages received from EPC or HNB in a macro-layer eNB and related to S1 logical interface. The control unit may be further configured to enable X2 interface relaying between HNB connected to the eNB. Accordingly, the controlling may further include identifying messages in a macro-layer eNB received from another eNB or HNB and related to X2 communications of HNB connected to the network via the macro-layer eNB. For example the, control unit 204 may be configured to tunnel S1 interface traffic received from HNB to EPC, and derive from traffic received from EPC tunnelled S1 interface traffic destined to HNB connected to the network via the macro-layer eNB.

In yet another example the control unit in macro-layer eNB may be configured to relay S1 communications between HNB and EPC and relay X2 communications between HNB and another HNB connecting to the network through the same or another macro-layer eNB. The logical interface between macro-layer eNB and HNBs can be implemented to route traffic destined to HNBs connected to the macro-layer eNB. For example, in routing S1 traffic received from the core network, macro-layer eNB may intercept the messages such as packets and forward only a part of the received message to the destination HNB. For example, considering S1 message received from the core network that is a message requesting a bearer setup for communications, including access and radio bearer parameters. Macro-layer eNB performs setting up and control of access network bearer and HNB performs setting up and control of radio bearer. Consequently, the macro-layer eNB forwards only the radio bearer parameters from the message to HNB, thus sends HNB only the information needed in HNB. Accordingly, while providing the core network interface to HNB, the provided interface may be a core network interface with reduced set of operations. Therefore, the macro-layer eNB may operate as implementing all the operations defined for the S1 core network interface as conventional, whereas HNB may only implement a part thereof. Accordingly, the complexity of HNB is reduced compared to HNB implementing a complete S1 core network interface. Alternatively, the macro-layer eNB may receive S1 message from the core network and forward the message destined to HNB, therefore, providing transparent S1 interface relaying. In such case, HNB will receive all the communication and operations provided by core network. The implementation of such HNB is more complex there being all the S1 interface operations implemented. In an embodiment of the invention the control unit in eNB may be configured to identify messages destined to HNBs connecting to the network through the macro-layer eNB. The identifying may comprise identifying the recipient of the message from the IP addresses used in the received messages from the core network or other eNBs. Also other addresses may be used to route traffic, such as Ethernet addresses. Identification may also be based on port numbers used. Also the identification may involve identifying the destination HNB based on HNB identifier or cell identifier, identifying the cell of eNB connecting HNB to network.

In an embodiment of the invention, in the control unit 204 of the apparatus 200 in macro-layer eNB, messages may be identified using bearer identifiers or identifiers in the messages. The bearer identifiers may be for example radio access bearer identifier and access network bearer identifier as in LTE and identifying resources and the properties of the resources on a communication path. For example, eNB may be configured to identify and map messages received from HNB connected to it, to the bearer between eNB and the core network, thus MME/S-GW. Therefore, the messages received from HNB in eNB on a bearer identified between eNB and HNB are mapped in eNB to the bearer between eNB and MME/S-GW. Accordingly the control unit in eNB is configured to store a mapping between bearer identifiers and map messages to be sent on the bearers based on the stored mapping.

In an embodiment of the invention, the control unit 204 in macro-layer eNB connecting one or more HNBs is configured to perform address translation to the traffic destined to HNBs, as HNBs according to the invention do not have direct connection to the core network. Traffic comprising messages and received from the core network by the Tx/Rx unit 202 is decoded in the macro-layer eNB. From the decoded messages, the macro-layer eNB determines the recipient of the message. If the recipient is not the macro-layer eNB itself, the recipient may be one of the HNBs the macro-layer eNB is connecting. When address translation is used, the messages destined to HNBs and received from the core network are identified by the control unit in the macro-layer eNB. An example of address translation protocol used in the macro-layer eNB is based upon MLSP (Multi-Label Switching Protocol) defined as IETF (Internet Engineering Task Force) draft specification. Another example is IP (Internet Protocol) address translation, thus translation IP addresses between IP address domains. Accordingly, the control unit in macro-layer eNB may be configured to perform address translation to messages received from the core network and destined to HNB and to messages destined to the core network from HNB. In order to do this, the control unit in macro-layer eNB identifies from the received messages, the destination, thus either HNB or core network and re-addresses the messages according to the address translation scheme applied in the control unit.

In an embodiment of the invention, the control unit 204 in macro-layer eNB connecting HNB to the network may be configured to decode the received messages from HNB or core network in order to identify the message destination or type. Consequently, the macro-layer eNB may be configured to identify that the received messages relate to S1 or X2 interface communication. Further, the control unit may be configured to identify whether the received messages relate to operations, functions, services or bearers available through S1 or X2 interface. Consequently, the control unit may identify that the message received from the core network is a message requesting bearer setup. In such case the macro-layer eNB may be configured to send to HNB only the radio access bearer parameters. In another example the control unit may identify that the received message is a handover measurement report message from HNB. Then, macro-layer eNB decodes the messages to identify, whether the message should be forwarded to MME in the core network or if the macro-layer eNB can take care of the handover procedure. Accordingly, the macro-layer eNB may be configured to identify whether the handover is between HNBs connected via the macro-layer eNB or between macro-layer eNB and HNB it connects, thus, within macro-layer eNB. In case the handover in question in the message is any other type of handover, the macro-layer eNB forwards the message to MME and performs address translation if needed. MME will then control the handover. However, if the handover is within the macro-layer eNB, the macro-layer eNB is configured to control the handover process. Controlling the handover comprises for example sending handover command to HNB defining the target of the handover, such as HNB or macro-layer eNB.

In an embodiment of the invention the apparatus 200 is HNB, operating in LTE E-UTRAN network. HNB communicates with the network via a logical interface, such as interface between eNB 102 and HNB 106 in FIG. 1, to a macro-layer eNB. Thus, Tx/Rx unit in HNB is configured to communicate with the core network via the macro-layer eNB, where the macro-layer eNB relays the core network S1 interface to HNB. Tx/Rx unit is further configured to communicate with other HNBs and eNBs using X2 interface implemented between HNB and macro-layer eNB. The control unit 204 is configured to control communications between HNB and eNB and to enable S1 interface communications with core network. The control unit 204 is in addition configured to control communications between HNB and eNB to enable X2 interface between HNB and other base stations such as HNB and eNB.

Conventionally in LTE network such as in EPS (Evolved Packet System) comprising EPC and E-UTRAN, the user plane PDUs are carried between the eNB and S-GW using GTP-U (GPRS Tunnelling Protocol for User Plane) as defined in 3GPP TS 36.300 V8.2.0 (2007-09). GTP-U is an IP-based protocol. GTP-U is also used on the X2 interface communications between eNBs. A bearer, for example access bearer from the core network node such as S-GW to eNB over S1 interface or a bearer between eNBs, is identified in GTP-U by TEID (Tunnel End Point Identifier), which is used to multiplex different connections in the same tunnel. For example, in eNB the access bearer between eNB and the core network identified with TEID is mapped to the radio bearer on the air interface. In an embodiment of the invention, TEID can be established between HNB and MME/S-GW as conventionally in LTE network. In the embodiment of the invention, TEID can be used in tunnelling the traffic to the destination HNB via the macro-layer eNB. In tunnelling, macro-layer eNB is configured to intercept GTP-U messages received from core network or connected HNBs and decode the GTP-U header of the received messages in order to determine the TEID in the GTP-U header. Macro-layer eNB stores information about TEIDs associated with HNBs. More specifically, the stored information comprises TEIDs associated with radio bearer identifiers of UEs connecting through HNBs. Consequently, IP based GTP-U messages received in macro-layer eNB are decoded to derive TEID in the message. Using the stored TEID and radio bearer identifier information macro-layer eNB identifies based on the TEID whether the message is destined to HNB connecting to the core LTE network through the macro-layer eNB. If yes, the macro-layer eNB relays the received message to destination HNB. Thus, in the macro-layer eNB connecting HNB to network a mapping is stored between TEID, associated radio bearer identifier and HNB address. The received messages can be routed to the HNB using HNB IP address, Ethernet address or address translation as necessary. Based on TEID and HNB IP address, eNB determines the destination HNB for the intercepted message and forwards the message to HNB. Therefore, messages tunnelled between eNB and the core network are relayed to the HNB and tunnelling of connections is enabled also for HNBs connecting to the network through macro-layer eNB. The embodiment of the invention can be thus utilized for providing S1 and X2 interfacing to the HNB, as macro-layer eNB is configured to identify TEID in the received messages. Consequently, also messages received from HNB in eNB are identified based on the radio bearer identifier to be mapped to the correct access bearer identified by TEID between eNB and core network, or alternatively to the correct access bearer identified by TEID on the X2 interface between the macro-layer eNBs. Mapping to correct bearer using TEID on the X2 interface facilitates communications between HNBs and HNB to eNB, which may be used in handover scenarios in LTE.

Accordingly, the core network node such as MME/S-GW or S-GW stores routing information, for example for routing IP traffic. The information may be IP addresses for example. As tunnelling through GTP-U is set up in the conventional way in LTE, the core network node is also aware of TEIDs associated with certain eNB. The core network node may route traffic to eNBs, thus by sending GTP-U messages with certain TEID to eNBs associated with the certain TEID. The core network node may, thus stored association between TEID and eNB, for example association between TEID and eNB IP address. Consequently, the core network node identifies TEID in GTP-U message and routes the IP packets comprising the GTP-U message to the eNB providing tunnelling the associated TEID. HNBs connecting to the network through a macro-layer eNB can in such a way be reached by the core network S1 logical interface communication, as the S1 communication using GTP-U, is directed to the macro-layer eNB connecting HNB to network.

Figure 3:
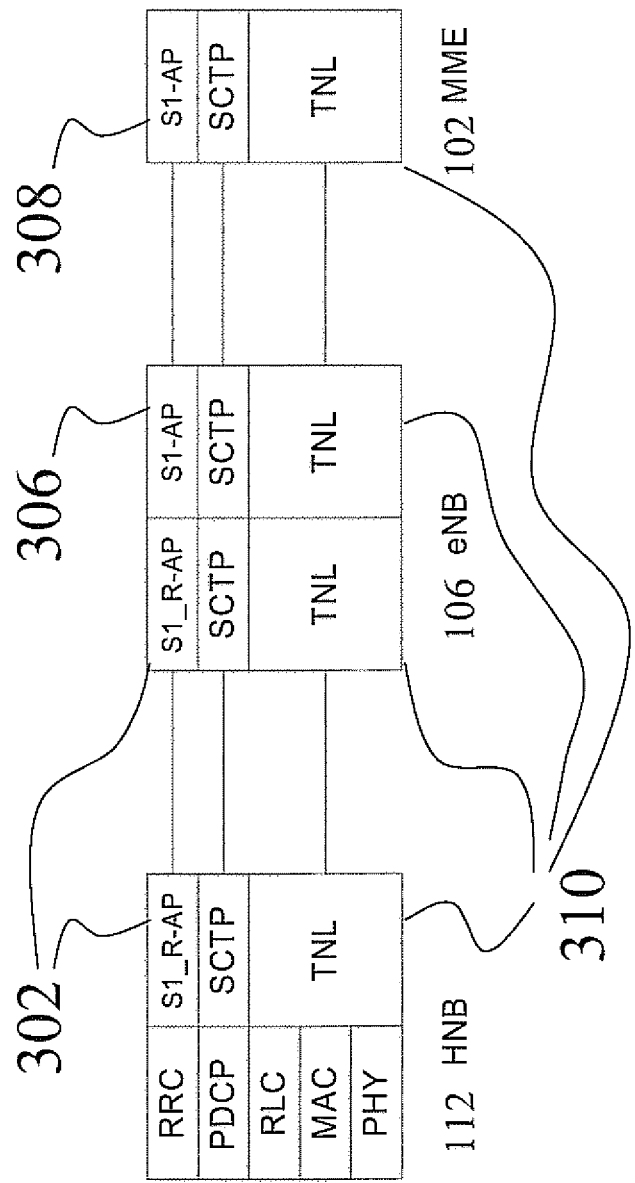
FIG. 3 shows protocol stacks according to an embodiment of the invention.

FIG. 3 illustrates protocol stacks according to an embodiment of the invention operating in LTE E-UTRAN. Specifically, the protocol stacks consider the control plane where application layer messages are delivered between eNB and MME or MME/S-GW using application layer signalling protocol, S1 application protocol (S1_AP). In the embodiment HNB is provided S1 connection through S1 relay application Protocol (S1_R-AP) 302 implemented in HNB 112 and 106 eNB as in FIG. 1. S1_R-AP is a peer-to-peer protocol between eNB and HNB. S1_R-AP in eNB may have multiple peer entities each set up and assigned for a HNB connected to it. With S1_R-AP, it is possible to connect several HNBs to eNB by implementing S1_R-AP 302 in HNBs 116 and 118 and connecting them with peer-to-peer connections to eNB 110 implementing S1_R-AP peer entities for both HNB connections, for example. According to the embodiment of FIG. 3, the S1 traffic of HNB 112 is received with S1_AP at eNB 106 from MME 102. As S1_AP is only between eNB and MME, HNB 112 S1 interface is, therefore, tunnelled via S1-AP between MME and eNB. The eNB identifies the tunnelled S1 connection traffic destined to HNB connected to eNB and relays the S1 traffic to HNB. When S1_R-AP traffic is received from HNB in eNB, the eNB tunnels the HNB S1 application layer messages through the S1_AP to MME. The task of S1_R-AP is to provide the S1 interface to HNBs connected to eNB. Therefore, messages destined to HNB and received in eNB, are identified and forwarded to HNB using S1_R-AP. S1_R-AP may provide only a subset of operations S1-AP provides to eNB. HNB, eNB and MME in FIG. 3 implement TNL (transport network layer) protocols 310 for routing the traffic between each other. In LTE, these protocols include IP protocol for example. Therefore, HNB eNB and MME, thus the LTE network, can use IP addressing in routing messages such as S1 and X2 interface messages between each other. Accordingly, the nodes are configured to decode messages sent using TNL protocols and determine based on the IP address of the message, the recipient of the message. TNL protocol stack used in FIG. 3, may also implement addressing used in Ethernet standard defined in IEEE 802.3. Thus, the network nodes implementing the protocol stacks in FIG. 3 may be configured to decode the received messages and determine the recipient of the message based on Ethernet addresses.

Figure 4:
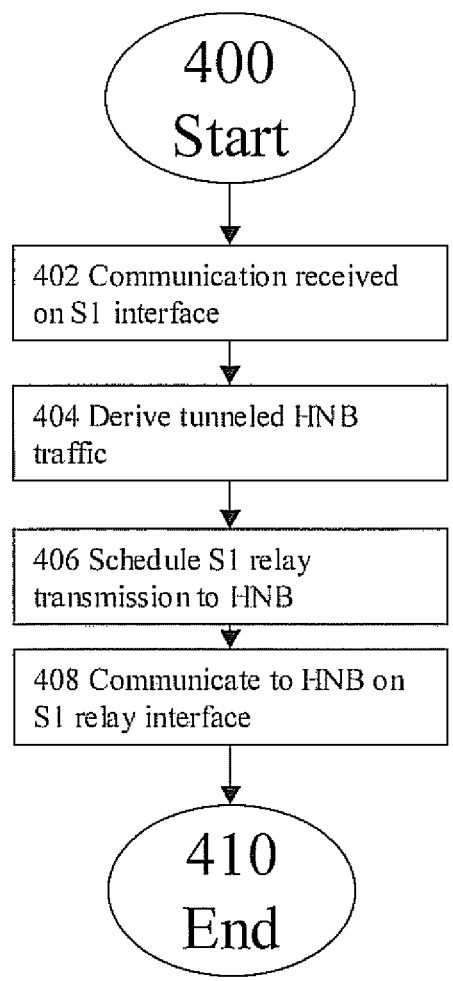
FIG. 4 shows a flow chart illustrating the operation of an embodiment of the invention.
Figure 5:
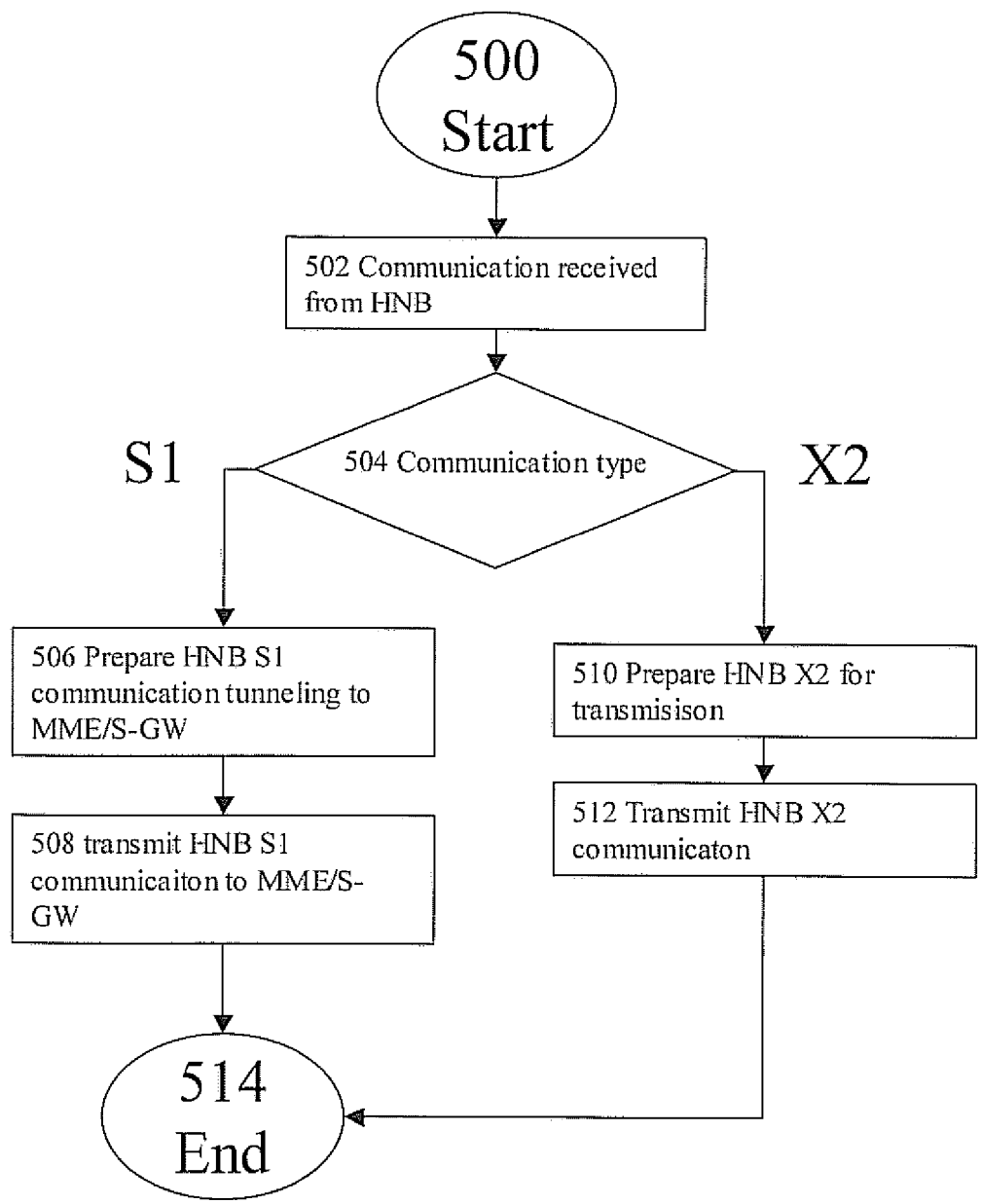
FIG. 5 shows a flow chart illustrating the operation of an embodiment of the invention.

FIGS. 4 and 5 present flow charts describing the operational steps performed by an apparatus according to the invention. According to an embodiment, the apparatus is LTE E-UTRAN eNB connecting HNB to network and providing core network connectivity to HNB. In LTE, eNB has S1 and X2 interfaces and it connects with HNB using S1_R-AP add X2 interface. Referring to FIG. 3, eNB may implement a protocol stack comprising S1-AP protocol 306 for communication with the core network node such as MME and S1_R-AP for connecting HNB to network and enabling S1 layer communication with core network node such as MME.

In FIG. 4, the operation starts in 400. eNB receives communication, such as messages, from core network through S1 interface and using S1-AP protocol in 402. In 404 eNB derives from the received communication messages destined to HNB. The deriving may comprise identifying HNB messages from the communication using identifiers in the messages. In 406 eNB prepares the derived messages to be transmitted to HNB. The prepared message may comprise all or part of the identified messages. In 408 eNB transmits the derived and prepared messages to HNB. The operation ends in 410.

In FIG. 5 the operation starts at 500. In 502 eNB receives communication from HNB. The communication may be S1_R-AP or X2 messages. In 504, eNB determines the message type, based on whether the message received from HNB is received on S1 or X2 interface. This may involve identifying the messages based on identifiers in the message. Thus eNB may store mapping between the identifiers and for example bearers on the S1 and X2 interface. In case the message is received on S1, the message is a message using S1_R-AP as in FIG. 3, protocol 302. Then in 506, eNB prepares a message according to S1-AP protocol 306 as in FIG. 3, and transmits in 508 the received S1 communication from HNB to the core network node such as MME or S-GW. The preparing may comprise mapping the identified message to be sent on the correct bearer to the core network node, according to the stored mapping. The mapping may also store the addresses to be used with the bearers, such as IP addresses. In case the message is received from HNB in 502 on X2 interface, eNB identifies the destination of the message in 510 for example using the stored mapping and transmits the messages towards it destination in 512. The operation ends in 514 after transmitting the received message in 508 or 512.

Figure 6:
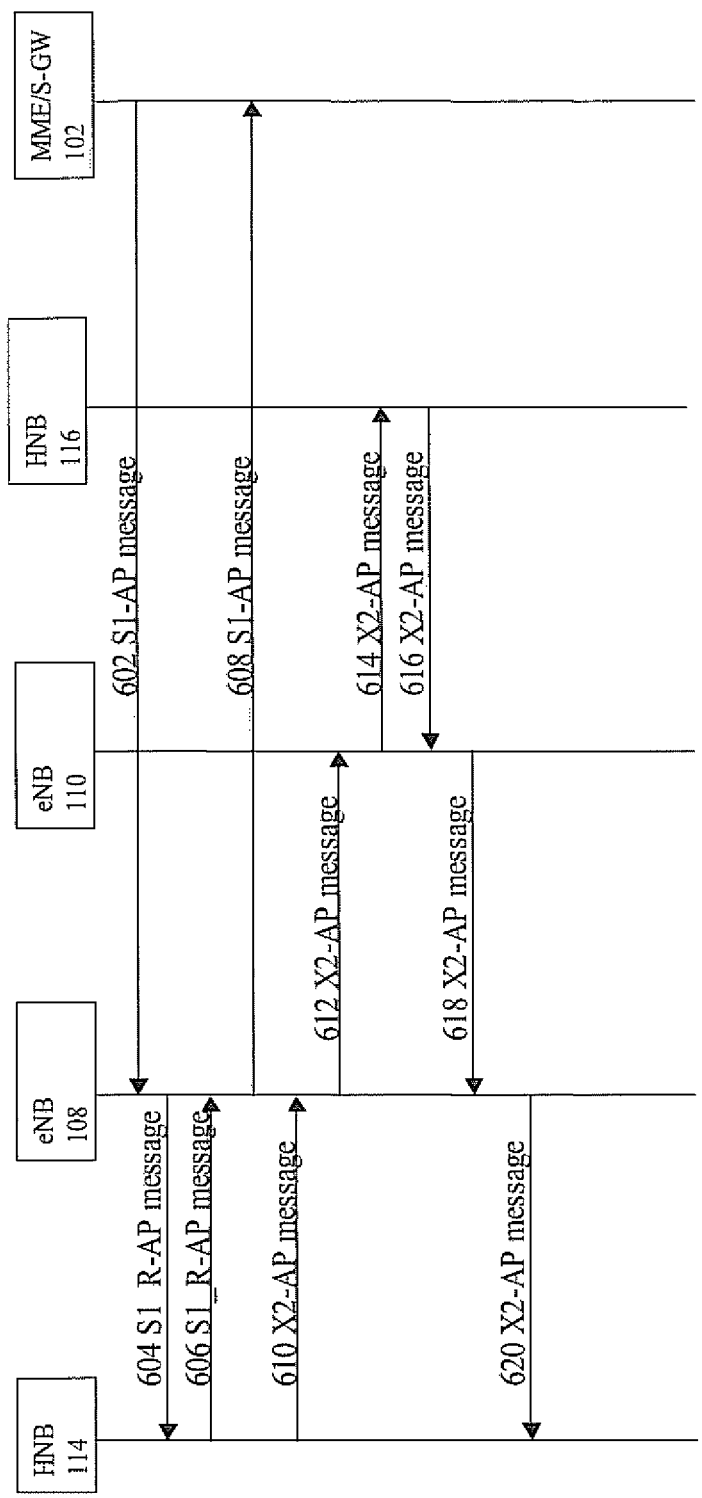
FIG. 6 shows a signalling chart according to an embodiment of the invention.

FIG. 6 shows exemplary messaging according to an embodiment of the invention. The messaging takes place in LTE network and considers exemplary usage scenarios of S1 and X2 logical interfaces in LTE when HNBs are introduced in LTE network. Considering messages 602 to 608 represent the SAE (system architecture evolution) bearer setup procedure in LTE. Then in 602, MME/S-GW transmits SAE BEARER SETUP REQUEST to HNB, to set up resources on S1 interface and air interface. The message 602 defines the requested resources on the transmission path to user equipment connected to the network on the air interface. In 604, eNB relays the received S1 message to HNB on the relay interface using S1_R-AP protocol. Accordingly, eNB determines that the message 602 is destined to HNB, for example based on an identifier in the message. After receiving the message 604 HNB establishes bearers and reserves resources for access bearers and responds with message 606 to inform MME/s-GW whether the resource reservation and bearer establishment was successful. In 608, eNB transmits S1 application layer message relaying the message received from HNB to MME/S-GW. In FIG. 6 also, another signalling procedure is illustrated according to an embodiment of the invention. Considering messages 610 to 620 to represent a handover preparation procedure in LTE in an embodiment of the invention. Then, in 610, HNB 112 transmits a message "HANDOVER REQUEST" on X2 interface to initiate handover to another HNB 116. The message is received by eNB 108 on X2 interface. eNB determines that the message is a message on the X2 interface by an identifier in the message. Using the mapping information such as addresses or bearer identifiers stored in eNB, eNB determines the recipient of the message to be HNB 116 and routes in 612 the message forward to eNB 110 connecting HNB 116 to network. It may be that eNB 108 determines only the bearer the message 610 should be forwarded on, that is that the messages should be forwarded on the bearer between eNBs 108 and 110. In such case, message 612 is sent to eNB 110 based on the mapping in eNB between the identifier in the message information stored in the eNB, such as bearer identifiers or addresses associated with eNB 110. When eNB 110 receives the message it identifies that the recipient is HNB connected to it and routes the message to HNB 116 in 614. eNB 110 may perform the identification based on an identifier received in the message and map the received identifier to the information stored in the eNB, such as bearer identifiers or addresses. When HNB 116 has performed the handover preparation procedure it transmits an "HANDOVER REQUEST ACKNOWLEDGE" to HNB 114, and the message is routed on X2 interface in the similar way as "HANDOVER REQUEST" request between HNBs 114 and 116.

The apparatus 200 in FIG. 2 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The steps/points, signaling messages and related functions described above in FIGS. 3, 4, 5 and 6 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations illustrate a procedure that may be implemented in one or more physical or logical entities. The signaling messages are only exemplary and may even comprise several separate messages for transmitting the same information. In addition, the messages may also contain other information.

Apparatuses, such as servers, or corresponding server components, base stations and/or other corresponding devices or apparatuses implementing the functionality of a corresponding apparatus described with an embodiment comprise not only prior art means. More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the Tx/Rx unit 202 or control unit 204 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a server, or a corresponding server component, or a base station may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

It will be obvious to a person skilled in the art that, as technology advances, the inventive concept can be implemented in various ways. The invention and its embodiments are not limited to the examples described above but may vary within the scope of the claims.

The invention claimed is:

1. A method useful for scalable deployment of network nodes, comprising:
   communicating in a first base station in a radio access network protocol and a core network node including a mobility management entity in a core network using messages associated with a first set of operations connecting the first base station to the core network;
   communicating in the first base station with other base stations of the radio access network using messages associated with a second set of operations connecting the radio access network nodes; and
   communicating in the first base station with a second base station using messages associated with a third set of operations, the third set of operations providing at least part of the operations provided by the first and second set of operations, wherein the first, the second, and the third set of operations comprise operations that implement transport network layer protocols for routing between the first base station, the core network node, and the third node second base station.

2. The method according to claim 1 further comprising:
   receiving messages in the first base station, the messages associated with the first or second set of operations;
   identifying in the first base station the received messages associated with the second base station; and
   delivering the identified messages to the second base station.

3. The method according to claim 2, wherein the identifying comprises determining an identifier in a message; determining the second base station address based on the identifier in the message, and sending the message to the second base station.

4. The method according to claim 1, further comprising:
   receiving a message in the first base station, the message associated to the third set of operations;
   determining a message type for the message;
   sending the message using the first or second set of operations based on the message type.

5. The method according to claim 1, further comprising:
   receiving a message in the first base station on the third set of operations from the second base station; determining a connection identifier for the message; and
   mapping the received message based on the connection identifier to the first or second set of operations, and sending the message, based on the mapping, using the first or second set of operations.

6. The method according to claim 5, wherein the connection identifier is a radio bearer identifier and the messages are mapped onto bearers carrying messages associated with the first or second set of operations.

7. The method according to claim 1, wherein each of the first, second and third set of operations define a logical interface, wherein the core network comprises a long term evolution network, and wherein the first set of operations are S1 logical interface operations, the second set of operations are X2 logical interface operations, and the third set of operations are S1/X2 logical interface operations that implement the transport network layer protocols in the long term evolution network.

8. The method according to claim 1, wherein the third set of operations comprises operations for at least one of a bearer management or a handover control.

9. A method useful for scalable deployment of network nodes, comprising:
   connecting to a first base station of a core network of a communications network using a first set of operations;
   connecting to a core network node including a mobility management entity in a radio access network using second set of operations; and
   connecting to a second base station in the radio access network using a third set of operations, the third set of operations comprising at least a part of the first and second set of operations, wherein the first, the second, and the third set of operations comprise operations that implement transport network layer protocols for routing between the first base station, the core network node, and the second base station.

10. The method according to claim 9 further comprising:
    receiving messages, the messages associated with the first or second set of operations;
    identifying the received messages associated with the second base station; and
    delivering the identified messages to the second base station.

11. The method according to claim 10, wherein the identifying comprises determining an identifier in a message; determining the second base station address based on the identifier in the message, and sending the message to the second base station.

12. The method according to claim 9, further comprising:
    receiving a message associated with the third set of operations;
    determining a message type for the message; and
    sending the message using the first or second set of operations based on the message type.

13. The method according to claim 9, further comprising:
    receiving a message associated with the third set of operations;
    determining a connection identifier for the message; and
    mapping the received message based on the connection identifier to the first or second set of operations, and sending the message, based on the mapping, using the first or second set of operations.

14. The method according to claim 13, wherein the connection identifier is a radio bearer identifier and the messages are mapped onto bearers on the first or second set of operations.

15. The method according to claim 9, wherein the set of operations defines a logical interface, wherein the core network comprises a long term evolution network, and wherein the first set of operations are S1 logical interface operations, the second set of operations are X2 logical interface operations, and the third set of operations are S1/X2 logical interface operations that implement the transport network layer protocols in the long term evolution network.

16. The method according to claim 9, wherein the third set of operations comprises operations for at least one of a bearer management or a handover control.

17. An apparatus useful for scalable deployment of network nodes, comprising:
    at least one processor; and
    at least one memory including computer program code, where the at least one memory and the computer program code are configured, with the at least one processor, to cause the apparatus to at least:
    communicate with a first base station of a core network of a communications network using messages, the messages associated with a first set of operations;
    communicate with a core network including a mobility management entity in the radio access network using messages associated with a second set of operations; and
    communicate with a second base station in the radio access network using messages associated with a third set of operations comprising at least part of the first and second set of operations, wherein the first, the second, and the third set of operations comprise operations that implement transport network layer protocols for routing between the first base station, the core network node and the second base station.

18. The apparatus according to claim 17, wherein the at least one memory including the computer program code is configured with the at least one processor to cause the apparatus to:
    receive messages, the messages associated with the first or second set of operations; identify the received messages associated with the second base station; and
    deliver the identified messages to the second base station so as to provide to the second base station a connection to the core network node and first base station.

19. The apparatus according to claim 18, wherein the at least one memory including the computer program code is configured with the at least one processor to cause the apparatus to:
    determine an identifier in a message;
    determine the second base station address based on the identifier in the message, and
    send the message to the second base station.

20. The apparatus according to claim 17, wherein the at least one memory including the computer program code is configured with the at least one processor to cause the apparatus to:
    receive a message associated with the third set of operations;
    determine a message type for the message; and
    send the messages on the first or second set of operations based on the message type.

21. The apparatus according to claim 17, wherein the at least one memory including the computer program code is configured with the at least one processor to cause the apparatus to:
    receive a message associated with the third set of operations;
    determine a connection identifier for the message;
    map the received message based on the connection identifier to the first or second set of operations; and
    send the message, based on the mapping, using the first or second set of operations.

22. The apparatus according to claim 21, wherein the connection identifier is a radio bearer identifier and the messages are mapped onto bearers on the first or second set of operations.

23. The apparatus according to claim 17, wherein each of the first, second and third set of operations defines a logical interface, wherein the core network comprises a long term evolution network, and wherein the first set of operations are S1 logical interface operations, the second set of operations are X2 logical interface operations, and the third set of operations are S1/X2 logical interface operations that implement the transport network layer protocols in the long term evolution network.

24. The apparatus according to claim 17, wherein the third set of operations comprises operations for at least one of a bearer management or a handover control.

25. A non-transitory memory embodying a computer program product comprising computer program instructions for executing a process according to the method of claim 9.

26. A system comprising an apparatus according to the apparatus of claim 17.

27. A method useful for scalable deployment of network nodes, comprising:
- communicating with a macro base station in a radio access network protocol and a gateway device in a core network using messages associated with S1 logical interface operations connecting the macro base station to the core network, wherein the core network comprises a long term evolution network;
- communicating in the macro base station with a second base station using messages associated with X2 logical interface operations connecting the second base station and the macro base station; and
- communicating in the macro base station between the second base station and the gateway device using messages associated with at least the S1 logical interface operations connecting the macro base station and the gateway device, and using messages associated with at least the X2 logical interface operations connecting the second base station and the macro base station, wherein the S1 and the X2 logical interface operations comprise operations that implement transport network layer protocols for routing between the macro base station, the second base station, and the gateway device.

28. The method according to claim 27, comprising identifying in the macro base station the received messages associated with the second base station; and delivering the identified messages to the second base station.

29. The method according to claim 27, wherein the S1 logical interface operations comprise operations for at least one of configuring system architecture evolution bearers, mobility support, paging, transport non-access stratum signaling, network sharing, roaming and area restriction, node selection, and initial context setup; and wherein the X2 logical interface operations comprises intra long term evolution mobility support such as handover control, load management and error handling.

30. The method according to claim 27, wherein the second base station comprises one of a home base station and a user equipment.

* * * * *

UNITED STATES PATENT AND TRADEMARK OFFICE
CERTIFICATE OF CORRECTION

PATENT NO. : 8,995,335 B2
APPLICATION NO. : 12/808215
DATED : March 31, 2015
INVENTOR(S) : Vainikka et al.

It is certified that error appears in the above-identified patent and that said Letters Patent is hereby corrected as shown below:

In the Claims

Claim 1, col. 12, line 30 "third" should be deleted.

Claim 1, col. 12, line 31 "node" should be deleted.

Signed and Sealed this
Twenty-third Day of June, 2015

Michelle K. Lee
*Director of the United States Patent and Trademark Office*

UNITED STATES PATENT AND TRADEMARK OFFICE
CERTIFICATE OF CORRECTION

PATENT NO.         : 8,995,335 B2                                                   Page 1 of 1
APPLICATION NO.    : 12/808215
DATED              : March 31, 2015
INVENTOR(S)        : Vainikka et al.

It is certified that error appears in the above-identified patent and that said Letters Patent is hereby corrected as shown below:

In the claims

Claim 17, column 14, line 3, --node-- inserted after "core network" and before "of".

Signed and Sealed this
Fifteenth Day of December, 2015

Michelle K. Lee
*Director of the United States Patent and Trademark Office*